United States Patent
Chakra et al.

(10) Patent No.: US 10,642,941 B2
(45) Date of Patent: May 5, 2020

(54) SYSTEM AND METHOD FOR PIPELINE MANAGEMENT OF ARTIFACTS

(71) Applicant: International Business Machines Corporation, Armonk, NY (US)

(72) Inventors: Al Chakra, Apex, NC (US); Liam Harpur, Dublin (IE); John Rice, Waterford (IE)

(73) Assignee: International Business Machines Corporation, Armonk, NY (US)

( * ) Notice: Subject to any disclaimer, the term of this patent is extended or adjusted under 35 U.S.C. 154(b) by 580 days.

(21) Appl. No.: 14/683,107

(22) Filed: Apr. 9, 2015

(65) Prior Publication Data

US 2016/0299764 A1 Oct. 13, 2016

(51) Int. Cl.
*G06F 17/40* (2006.01)
*G06F 17/27* (2006.01)
(Continued)

(52) U.S. Cl.
CPC ............ *G06F 17/40* (2013.01); *G06F 9/44* (2013.01); *G06F 17/218* (2013.01); *G06F 17/24* (2013.01); *G06F 17/2705* (2013.01)

(58) Field of Classification Search
CPC ......... G06F 17/30289; G06F 17/30336; G06F 17/30085; G06F 3/0619; G06F 11/1469; G06F 9/45512; G06F 17/30371; G06F 3/0608; G06F 17/30575; G06F 17/30557; G06F 11/1451; G06F 17/30011;
(Continued)

(56) References Cited

U.S. PATENT DOCUMENTS 6,061,697 A * 5/2000 Nakao ............... G06F 17/2247
707/999.003
7,689,510 B2 3/2010 Lamkin et al.
(Continued)

OTHER PUBLICATIONS

IBM; "A method and apparatus for Linkage Based Software Development Lifecycle Management"; IPCOM000137130; IP.com; Jun. 2006.
(Continued)

*Primary Examiner* — Jay A Morrison
*Assistant Examiner* — Antonio J Caiado
(74) *Attorney, Agent, or Firm* — North Shore Patents, P.C.; Joseph L. Acayan (57) ABSTRACT

In the management of deleted content, deleted data is input into a data analysis engine from one or more first computing devices. A parsing module parses the attributes of the deleted data and modifies the metadata of the deleted data based on results of the parsing. A routing module determines a pipeline with attributes matching the modified metadata of the deleted data and routes the modified deleted data to the pipeline. The modified deleted data in the pipeline is managed based on the pipeline configuration. One of more second computing devices may access the pipeline and evaluate the metadata of the modified deleted data in the pipeline. The one or more second computing devices determine whether or not to inherit the modified deleted data. In determining to inherit the modified deleted data, the one or more second computing devices assume ownership of the modified deleted data.

20 Claims, 4 Drawing Sheets

(51) Int. Cl.
*G06F 9/44* (2018.01)
*G06F 17/21* (2006.01)
*G06F 17/24* (2006.01)

(58) Field of Classification Search
CPC ...... G06F 17/30138; G06F 17/40; G06F 9/44; G06F 17/218; G06F 17/24; G06F 17/2705; H04L 67/1097; H04N 5/44543
USPC ............... 707/737, 736, 794, 696, 662, 564
See application file for complete search history.

(56) References Cited

U.S. PATENT DOCUMENTS

| | | | | |
|---|---|---|---|---|
| 7,693,877 | B1* | 4/2010 | Zasman | H04L 67/1097 707/662 |
| 8,234,640 | B1* | 7/2012 | Fitzgerald | G06F 21/53 718/1 |
| 8,290,991 | B2* | 10/2012 | Kahn | G06F 17/30997 707/687 |
| 8,943,222 | B1* | 1/2015 | Scharler | G05B 19/0428 707/601 |
| 9,047,312 | B1* | 6/2015 | Ten-Pow | G06F 17/3023 |
| 2002/0099694 | A1* | 7/2002 | Diamond | G06F 16/9535 |
| 2003/0217164 | A1* | 11/2003 | Cai | G06F 21/64 709/229 |
| 2004/0260674 | A1* | 12/2004 | Primm | G06F 11/3058 |
| 2007/0230778 | A1* | 10/2007 | Matulic | G06K 9/00456 382/165 |
| 2007/0271274 | A1* | 11/2007 | Purang | G06F 17/3089 |
| 2007/0271286 | A1* | 11/2007 | Purang | G06F 17/3071 |
| 2008/0077627 | A1* | 3/2008 | Yachi | G11B 27/034 |
| 2008/0215588 | A1* | 9/2008 | Mattheisen | G06F 21/604 |
| 2009/0106675 | A1* | 4/2009 | Moon | G06F 3/048 715/762 |
| 2009/0234727 | A1 | 9/2009 | Petty | |
| 2010/0017443 | A1* | 1/2010 | Xie | H04L 67/1095 707/E17.007 |
| 2010/0031162 | A1 | 2/2010 | Wiser et al. | |
| 2010/0070725 | A1* | 3/2010 | Prahlad | G06F 11/1453 711/162 |
| 2010/0088317 | A1* | 4/2010 | Bone | G06F 17/30094 707/737 |
| 2010/0145917 | A1* | 6/2010 | Bone | G06F 17/30082 707/694 |
| 2010/0235367 | A1* | 9/2010 | Chitiveli | G06F 16/353 707/752 |
| 2010/0274750 | A1* | 10/2010 | Oltean | G06F 17/30115 706/47 |
| 2011/0016486 | A1* | 1/2011 | Morimoto | H04H 20/62 725/32 |
| 2011/0145206 | A1* | 6/2011 | Kahn | G06F 17/30348 707/690 |
| 2011/0302454 | A1* | 12/2011 | Prophete | G06F 11/3688 714/38.1 |
| 2011/0307500 | A1* | 12/2011 | Li | H04L 67/24 707/755 |
| 2014/0181047 | A1* | 6/2014 | Pawar | G06F 11/1474 707/654 |
| 2014/0330780 | A1* | 11/2014 | Chen | G06F 17/30575 707/625 |
| 2015/0088646 | A1* | 3/2015 | Mody | G06Q 30/0255 705/14.53 |
| 2015/0205834 | A1* | 7/2015 | Keeton | G06F 17/301 707/714 |
| 2015/0234879 | A1* | 8/2015 | Baldwin | G06F 17/30342 707/694 |
| 2015/0358420 | A1* | 12/2015 | Mese | G06F 3/04842 715/748 |
| 2016/0162370 | A1* | 6/2016 | Mehta | G06F 11/1461 707/610 |
| 2016/0260184 | A1* | 9/2016 | Morimoto | G06Q 50/18 |

OTHER PUBLICATIONS

KBR (Kellogg Brown Root, LLC), "Pipelines: Integrated Solutions for Worldwide Pipelines"; IPCOM000217738; IP.com; May 2012.

* cited by examiner

SYSTEM AND METHOD FOR PIPELINE MANAGEMENT OF ARTIFACTS

BACKGROUND

Currently, the deletion of content in communities often involves the possible removal of the content from "trash" and the possible restoration from a backup. The amount of data in such communities is increasing, and users are spending increasing amounts of time deleting or cleaning content in order to save storage and other system resources. However, in deleting the content, inadvertent deletion of valuable data may occur. The reuse of the content by other users is often not achieved. This may result in efficiencies in content use and potential loss of valuable data.

SUMMARY

According to one embodiment of the present invention, in the management of deleted content, deleted data is input into a data analysis engine from one or more first computing devices. A parsing module parses the attributes of the deleted data and modifies the metadata of the deleted data based on results of the parsing. A routing module determines a pipeline with attributes matching the modified metadata of the deleted data and routes the modified deleted data to the pipeline. The modified deleted data in the pipeline is managed based on the pipeline configuration. One of more second computing devices may access the pipeline and evaluate the metadata of the modified deleted data in the pipeline. The one or more second computing devices determine whether or not to inherit the modified deleted data. In determining to inherit the modified deleted data, the one or more second computing devices assume ownership of the modified deleted data.

System and computer program products corresponding to the above-summarized methods are also described and claimed herein.

DETAILED DESCRIPTION

Figure 1:
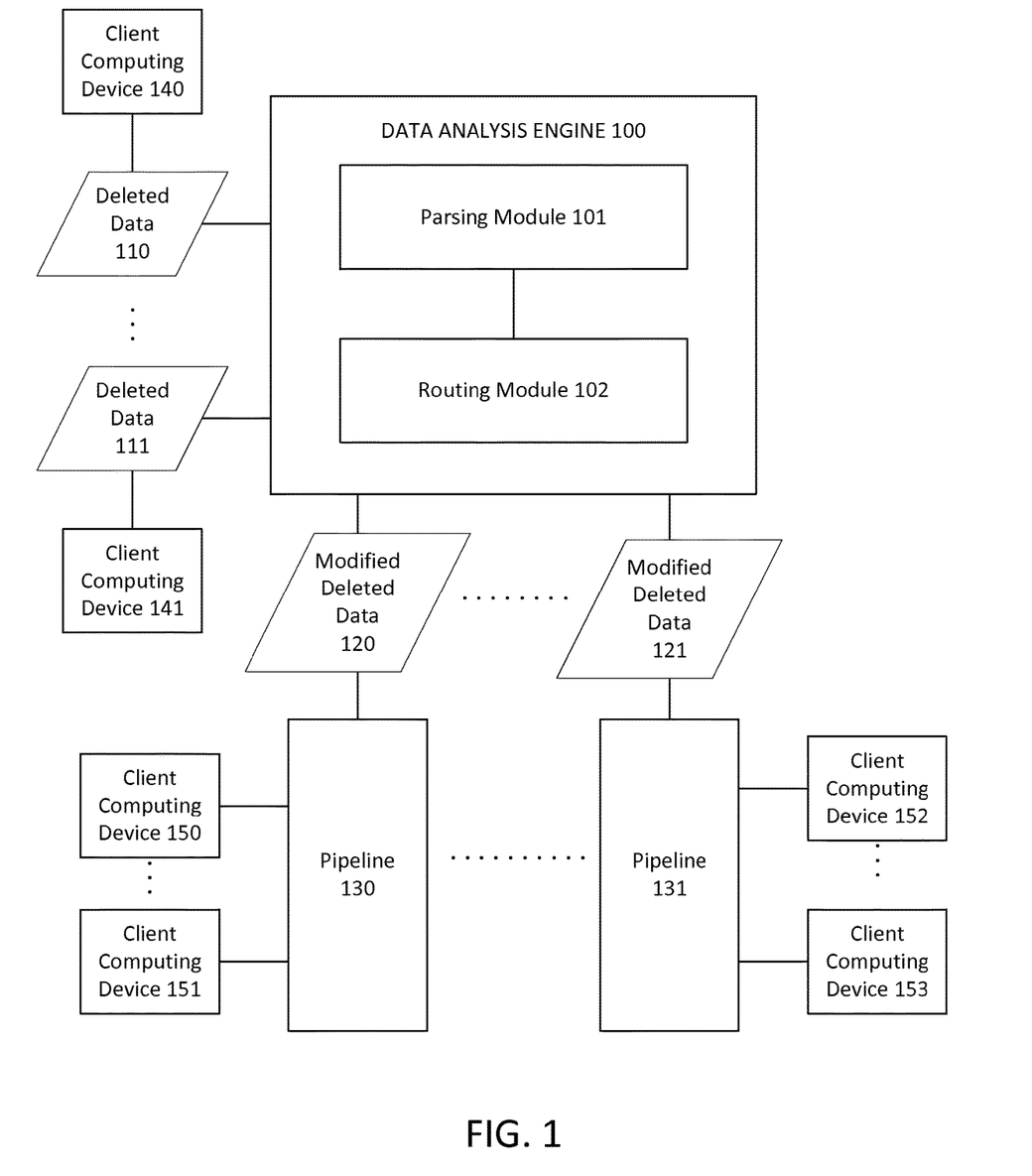
FIG. 1 illustrates a system for pipeline management of deleted content according to embodiments of the present invention.
Figure 2:
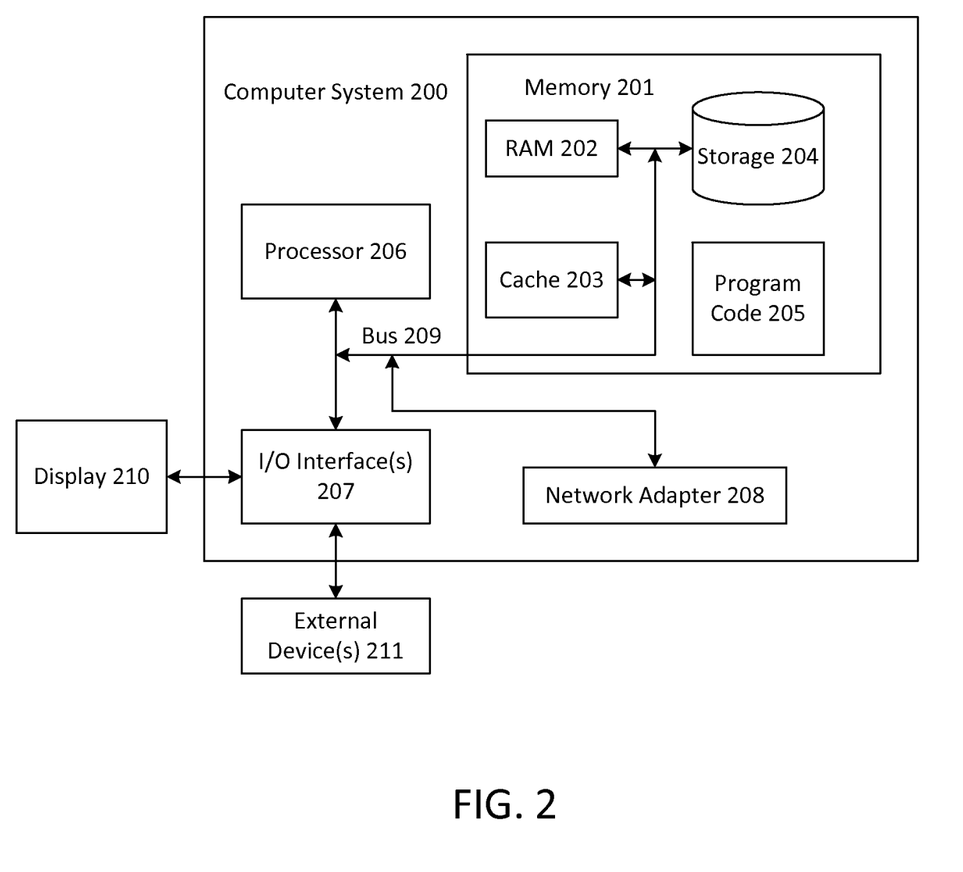
FIG. 2 illustrates a computer system according to embodiments of the present invention.

FIG. 1 illustrates a system for pipeline management of deleted content according to embodiments of the present invention. The system includes a data analysis engine 100, which includes a parsing module 101 and a routing module 102, the functionalities of which are described further below. The data analysis engine 100 receives as input deleted data 110-111 from one or more client computing devices 140-141. The client computing devices 140-141 may be associated with individual users, a community of users, an organization, a platform, or other entities. The data analysis engine 100 sends as output modified deleted data 120-121 to one or more pipelines 130-131. One or more client computing devices 150-153 may then access the modified deleted data 120-121 in the pipeline 130-131. A "pipeline", as used in this specification, refers to a plurality of processing elements, such as processes, threads, routines, etc.

The data analysis engine 100 may be implemented by one or more computer systems as illustrated in FIG. 2. FIG. 2 illustrates a computer system according to embodiments of the present invention. The computer system 200 is operationally coupled to a processor or processing units 206, a memory 201, and a bus 209 that couples various system components, including the memory 201 to the processor 206. The bus 209 represents one or more of any of several types of bus structure, including a memory bus or memory controller, a peripheral bus, an accelerated graphics port, and a processor or local bus using any of a variety of bus architectures. The memory 201 may include computer readable media in the form of volatile memory, such as random access memory (RAM) 202 or cache memory 203, or non-volatile storage media 204. The memory 201 may include at least one program product having a set of at least one program code module 105 that are configured to carry out the functions of embodiment of the present invention when executed by the processor 206. The computer system 200 may also communicate with one or more external devices 211, such as a display 210, via I/O interfaces 207. The computer system 200 may communicate with one or more networks via network adapter 208.

Figure 3:
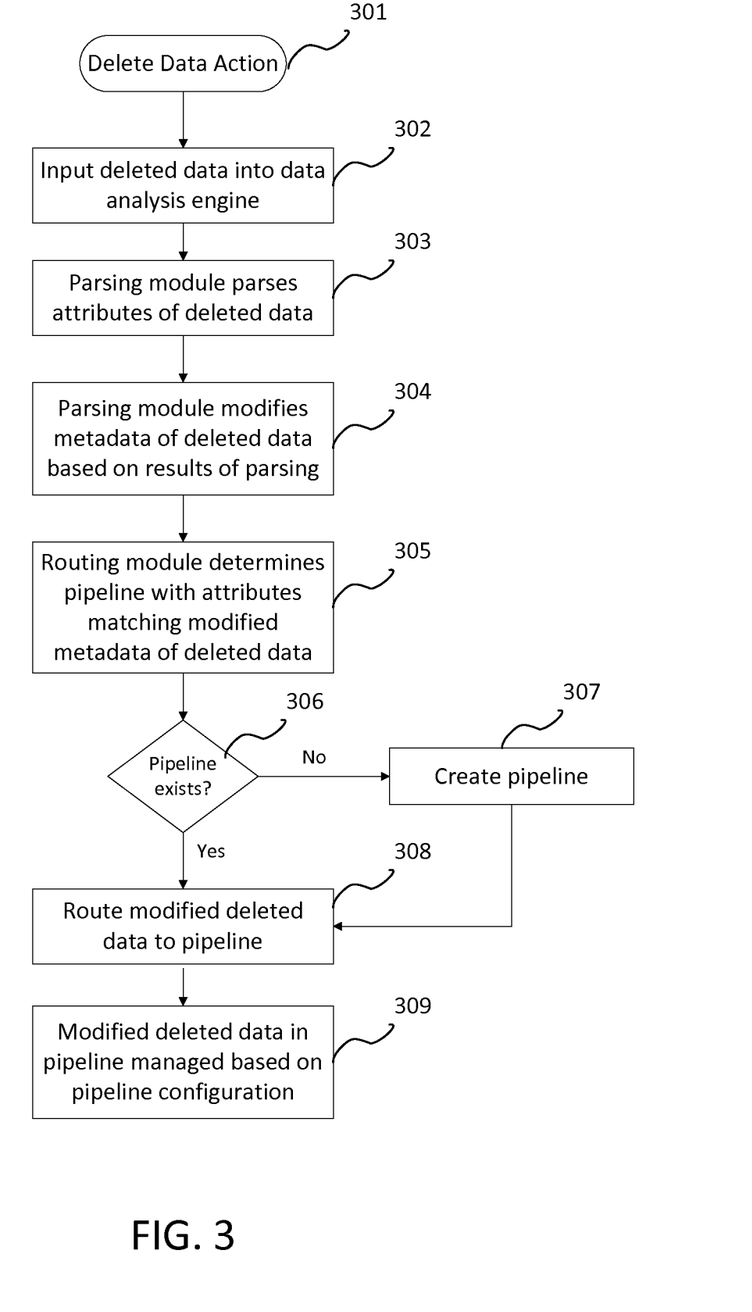
FIG. 3 illustrates a method for pipeline management of deleted content according to embodiments of the present invention.

FIG. 3 illustrates a method for pipeline management of deleted content according to embodiments of the present invention. Preferences to enable the functionalities of the method may be configured by an individual user at a client computing device 110 or by an administrator for a group of client computing devices 110-111. The method may be explicitly enabled or may be configured to be enabled based on one or more criteria (e.g. "enable for content sent to me from people with more seniority"; "enable for content sent to me from people within a certain degree in a social network graph"; and "enable only for this social community"). Preferences may be set to configure how the deletion of the data 110 is applied (e.g. "move attachment on harddrive to "Trash" folder on the system for X hours before routing to a pipeline"). Preferences may be set to configure processing steps if content is ascertained to be resurrected to the original location (e.g. when an item in the recycle bin folder is to be restored), or in a modified format, or used as part of an aggregation operation.

Referring to both FIGS. 1 and 3, the functionalities of the method may be triggered by a delete data action (301) at a client computing device 140. At the time of the delete data action, some attributes of the deleted data 110 may exist and be stored as metadata, such as last modified date, owner, and storage location for the deleted data (e.g. "trash" or "recycle bin" folder). The deleted data 110, with its existing attributes, are input into the data analysis engine 100 (302). The parsing module 101 parses the attributes of the deleted data 110 (303), including possibly using natural language support to parse the content of the deleted data 100. The parsing module 101 modifies the metadata of the deleted data 110 based on the results of the parsing (304), creating the modified deleted data 120. In one embodiment, a user, manager, or administrator of a community may initiate a call for a certain type of data to be deleted, creating a new data-type, and this data-type may be added to the metadata of the deleted data 110. The parsing module 101 may identity one or more categories of the content of the deleted data 110, and these categories may be added to its metadata. A relevancy score may be calculated for the categories and added to the metadata by the parsing module 101. Other added metadata may include but are not limited to: creation date; modification history; division; geography; location; department; team; project; organizational position; and any other information that may be used by the routing module 102. or a pipeline. A learning algorithm may be used by the parsing module 101, where existing metadata are parsed, validated, and made available for being added to the metadata of other deleted data.

The routing module 102 determines the pipeline with attributes matching the modified metadata of the deleted data 110 (305). For example, pipeline 130 may be configured for a particular community which includes a certain team in a certain department, working on a certain project. The routing module 102 matches the department, team, and project metadata of the modified deleted data 120 with the department, team, and project attributes of the pipeline 130. The routing module 102 then determines whether the pipeline 130 exists (306), and if not, the pipeline 130 is created (307). The routing module 103 then routes the modified deleted data 120 to the pipeline 130 (308), where it may be joined with other deleted data from other communities. For example, an administrator or a quorum for the community may configure the parsing module 101 to add an identity of the community associated with the deleted data to the metadata of the deleted data 110. The attributes of the pipeline 130 may be configured to include this identity of the community, such that deleted data from all users in the identified community is routed to the same pipeline 130. For another example, a user in a particular social network may configure the parsing module 101 to add the data-type or category of the content to the metadata of the deleted data 100, and configure the attributes of the pipeline 130 to include the data-type or categories, such that the content from the particular social network are routed to the same pipeline 130. For another example, a user or administrator may configure the parsing module 101 to add an identity of the platform on which the deleted data 110 was residing. The attributes of the pipeline 130 may be configured to include this identity of the platform, such that, when the originating platform is deleted, the contents on the platform are routed to the same pipeline 130.

Figure 4:
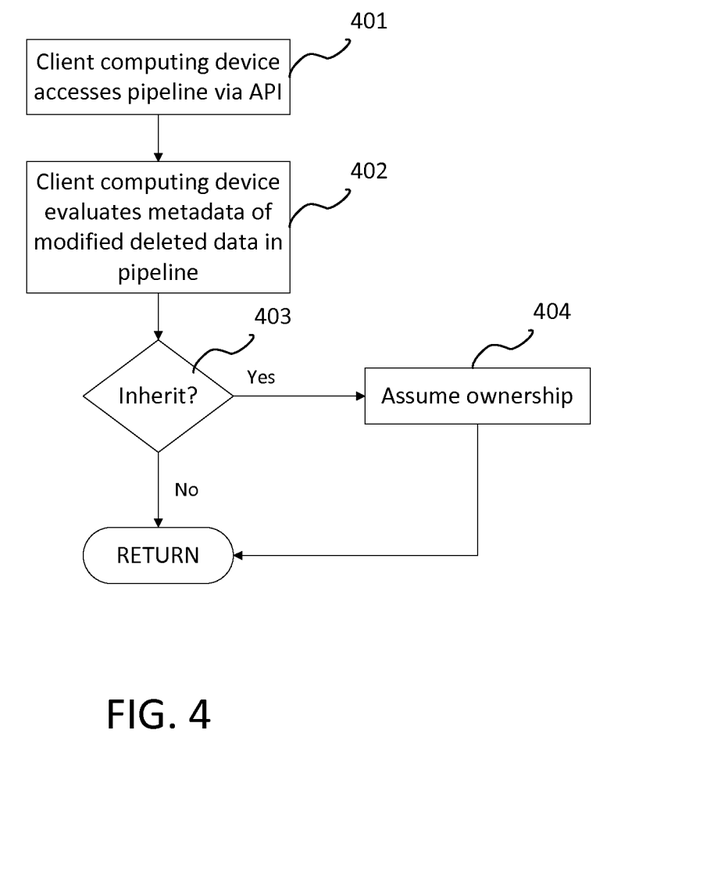
FIG. 4 illustrates a method of inheriting deleted content according to embodiments of the present invention.

The modified deleted data 120 in the pipeline 130 is then managed based on the configuration of the pipeline 130 to which it is routed (309). For example, the pipeline 130 is configured with a limited amount of storage. Modified deleted data 120 stored in the pipeline 130 thus should be purged as new modified deleted data 120 is routed to the pipeline 130. The purging of the modified deleted 120 may be configured based on a variety of factors, such as the age of the data (e.g. purge data older than 3 months), a predetermined hierarchy of content categories (e.g. purge data in category 1 before data in category 2), a predetermined relevancy score (e.g. purge data with a score below a threshold), or some combination of these factors. Prior to the modified deleted data 120 being purged, one or more client computing devices 150-151 may access the modified deleted data 120 in the pipeline 130, as illustrated in FIG. 4. In this embodiment, a client computing device 150 accesses the pipeline 130 via an application programming interface (API) (401). The client computing device 150 evaluates the metadata of the modified deleted data 120 in the pipeline 130 (402) and makes a determination of whether or not to inherit the data 120 (403). If so, then the client computing device 150 assumes ownership of the data 120 (404). Either a push or pull mechanism may be applied to direct users to the modified deleted data 120 in the pipeline 130. For example, the pipeline 130 may be configured with a trigger to push an alert to users of a group who may be interested in the data 120. Certain trusted group members may be configured to have full access to the data 120. The group members may access the data via their corresponding client computing device 150 and API and make a determination whether they wish to inherit the data 120. In this manner, one or more individuals or groups may benefit from the deleted data of other individuals or groups.

In one embodiment, the data analysis engine 100 may be configured according to predetermined policies when the modified delete data 121 will be routed to a pipeline 131 that allows for public access to the data 121. For example, the parsing module 101 may be configured to parse the deleted data 110-111, identify sensitive information, and remove such sensitive information prior to passing the deleted data 110-111 to the routing module 103. Thus, the modified deleted data 121 routed o the pipeline 131 will be "cleaned" of sensitive information. For another example, terms of an agreement between the owners of the modified deleted data 121 and potential consumers of the data 121 may apply. The parsing module 101 may be configured to identity the deleted data 110-111 relevant to the agreement and to add metadata pertinent to the terms of the agreement, and the routing module 102 may be configured to route the modified deleted data 121 accordingly. For example, the parsing module 101 may identify the deleted data 110-111 to which terms of a sales agreements apply and add metadata pertaining to pricing, volume of data, relevancy to the agreement, etc., as set forth in the sales agreement. Routing of the modified deleted data 121 is then performed by the routing module 102 accordingly.

Although embodiments of the present invention are described above in the example contexts of communities, groups, and/or platforms, the embodiments may be implemented in other contexts as well, such as by computer device, person, temporal file collection, and application level, without departing from the spirit and scope of the present invention. For example, each node inputting deleted data into the data analysis engine 100 may be a mobile device, such that the deleted data from one mobile device may be routed to a pipeline from which another mobile device may inherit. For another example, each node inputting deleted data into the data analysis engine 100 may be associated with a person, such that the deleted data from one person may be routed to a pipeline from which person may inherit. For another example, deleted data associated with an application at a node may be input into the data analysis engine 100, such that the deleted data may be routed to a pipeline from which the same application at another node may inherit.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for management of deleted content, implemented by a processor, comprising:
    receiving, by the processor, an input of deleted data from one or more first computing devices;
    parsing attributes of the deleted data, wherein the parsing of the attributes includes:
        identifying one or more content categories of the deleted data;
    modifying metadata of the deleted data based on results of the parsing, wherein the modifying of the metadata includes:

adding metadata to the deleted data to create the modified deleted data, wherein the metadata includes attributes and content categories of the deleted data that were identified during the parsing of the attributes of the deleted data;

generating relevancy scores for the content categories, wherein each relevancy score is associated with a respective content category, and wherein each relevancy score indicates a relevancy of a respective category to the deleted data; and adding the relevancy scores to the metadata;

determining at least one pipeline with attributes and categories matching the modified metadata of the deleted data;

routing the modified deleted data to the at least one pipeline, wherein the modified deleted data is managed based on a configuration of the at least one pipeline;

determining the configuration of the at least one pipeline;

purging the modified deleted data from the at least one pipeline based on one or more predetermined factors as new modified deleted data is routed to the at least one pipeline based on the configuration of the at least one pipeline, wherein the one or more predetermined factors comprise a predetermined hierarchy of the content categories; and purging, from the at least one pipeline, modified deleted data associated with a category having a relevancy score that falls below a predefined threshold.

2. The method of claim 1, wherein the routing of the modified deleted data to the at least one pipeline comprises:
determining whether the at least one pipeline exists; and
in determining that the at least one pipeline does not exist, creating the at least one pipeline and routing the modified deleted data to the at least one pipeline.

3. The method of claim 1, further comprising:
accessing the at least one pipeline by one or more second computing devices;
evaluating the metadata of the modified deleted data in the at least one pipeline by the one or more second computing devices;
determining whether or not to inherit the modified deleted data by the one or more second computing devices; and
in determining to inherit the modified deleted data, accessing the modified deleted data by the one or more second computing devices.

4. The method of claim 1, further comprising purging the modified deleted data associated with a first category before purging the modified deleted data associated with a second category.

5. The method of claim 1, wherein the added metadata comprises one or more of the following: one or more content categories; a data type; and an identity of a community associated with the deleted data.

6. The method of claim 1, wherein the parsing of the attributes of the deleted data comprises:
identifying any sensitive information in the deleted data; and
removing the sensitive information from the deleted data before routing the modified deleted data to the at least one pipeline.

7. The method of claim 1, wherein the parsing of the attributes of the deleted data further comprises:
identifying any agreement applicable to the deleted data; and
adding metadata to the deleted data pertinent to terms of the agreement.

8. A computer program product for management of deleted content, the computer program product comprising a computer readable storage medium having program instructions embodied therewith, the program instructions executable by a processor to cause the processor to perform a method comprising:
receiving an input of deleted data from one or more first computing devices;
parsing attributes of the deleted data, wherein the parsing of the attributes includes:
identifying one or more content categories of the deleted data;
modifying metadata of the deleted data based on results of the parsing, wherein the modifying of the metadata includes:
adding metadata to the deleted data to create the modified deleted data, wherein the metadata includes attributes and content categories of the deleted data that were identified during the parsing of the attributes of the deleted data;
generating relevancy scores for the content categories, wherein each relevancy score is associated with a respective content category, and wherein each relevancy score indicates a relevancy of a respective category to the deleted data; and
adding the relevancy scores to the metadata;
determining at least one pipeline with attributes and categories matching the modified metadata of the deleted data;
routing the modified deleted data to the at least one pipeline, wherein the modified deleted data is managed based on a configuration of the at least one pipeline;
determining the configuration of the at least one pipeline;
purging the modified deleted data from the at least one pipeline based on one or more predetermined factors as new modified deleted data is routed to the at least one pipeline based on the configuration of the at least one pipeline, wherein the one or more predetermined factors comprise a predetermined hierarchy of the content categories; and
purging, from the at least one pipeline, modified deleted data associated with a category having a relevancy score that falls below a predefined threshold.

9. The product of claim 8, wherein the routing of the modified deleted data to the at least one pipeline comprises:
determining whether the at least one pipeline exists; and
in determining that the at least one pipeline does not exist, creating the at least one pipeline and routing the modified deleted data to the at least one pipeline.

10. The product of claim 8, wherein the method further comprises:
accessing the at least one pipeline by one or more second computing devices;
evaluating the metadata of the modified deleted data in the at least one pipeline by the one or more second computing devices;
determining whether or not to inherit the modified deleted data by the one or more second computing devices; and
in determining to inherit the modified deleted data, accessing the modified deleted data by the one or more second computing devices.

11. The product of claim 8, wherein the purging of the modified deleted data from the at least one pipeline is further based on one or more predetermined factors, and wherein the one or more predetermined factors comprise one or more of an age of the modified deleted data, and a predetermined relevancy of the modified deleted data.

12. The product of claim 8, wherein the added metadata comprises one or more of the following: one or more content categories; a data type; and an identity of a community associated with the deleted data.

13. The product of claim 8, wherein the parsing of the attributes of the deleted data comprises:
identifying any sensitive information in the deleted data; and
removing the sensitive information from the deleted data before routing the modified deleted data to the at least one pipeline.

14. The product of claim 8, wherein the parsing of the attributes of the deleted data further comprises:
identifying any agreement applicable to the deleted data; and
adding metadata to the deleted data pertinent to terms of the agreement.

15. A system, comprising:
a processor; and
a computer readable storage medium having program instructions embodied therewith, the program instructions executable by the processor to cause the processor to perform a method comprising:
receiving an input of deleted data from one or more first computing devices;
parsing attributes of the deleted data, wherein the parsing of the attributes includes:
identifying one or more content categories of the deleted data;
modifying metadata of the deleted data based on results of the parsing, wherein the modifying of the metadata includes:
adding metadata to the deleted data to create the modified deleted data, wherein the metadata includes attributes and content categories of the deleted data that were identified during the parsing of the attributes of the deleted data;
generating relevancy scores for the content categories, wherein each relevancy score is associated with a respective content category, and wherein each relevancy score indicates a relevancy of a respective category to the deleted data; and
adding the relevancy scores to the metadata;
determining at least one pipeline with attributes and categories matching the modified metadata of the deleted data;
routing the modified deleted data to the at least one pipeline, wherein the modified deleted data is managed based on a configuration of the at least one pipeline;
determining the configuration of the at least one pipeline;
purging the modified deleted data from the at least one pipeline based on one or more predetermined factors as new modified deleted data is routed to the at least one pipeline based on the configuration of the at least one pipeline, wherein the one or more predetermined factors comprise a predetermined hierarchy of the content categories; and
purging, from the at least one pipeline, modified deleted data associated with a category having a relevancy score that falls below a predefined threshold.

16. The system of claim 15, wherein the routing of the modified deleted data to the at least one pipeline comprises:
determining whether the at least one pipeline exists; and
in determining that the at least one pipeline does not exist, creating the at least one pipeline and routing the modified deleted data to the at least one pipeline.

17. The system of claim 15, wherein the method further comprises:
accessing the at least one pipeline by one or more second computing devices;
evaluating the metadata of the modified deleted data in the at least one pipeline by the one or more second computing devices;
determining whether or not to inherit the modified deleted data by the one or more second computing devices; and
in determining to inherit the modified deleted data, accessing the modified deleted data by the one or more second computing devices.

18. The system of claim 15, wherein the purging of the modified deleted data from the at least one pipeline is further based on one or more predetermined factors, and wherein the one or more predetermined factors comprise one or more of an age of the modified deleted data, and a predetermined relevancy of the modified deleted data.

19. The system of claim 15, wherein the parsing of the attributes of the deleted data comprises:
identifying any sensitive information in the deleted data; and
removing the sensitive information from the deleted data before routing the modified deleted data to the at least one pipeline.

20. The system of claim 15, wherein the parsing of the attributes of the deleted data further comprises:
identifying any agreement applicable to the deleted data; and
adding metadata to the deleted data pertinent to terms of the agreement.

* * * * *